Aug. 19, 1952  R. DE VRIES  2,607,170
APPARATUS FOR CONTACTING MOLTEN GLASS
Filed June 15, 1950
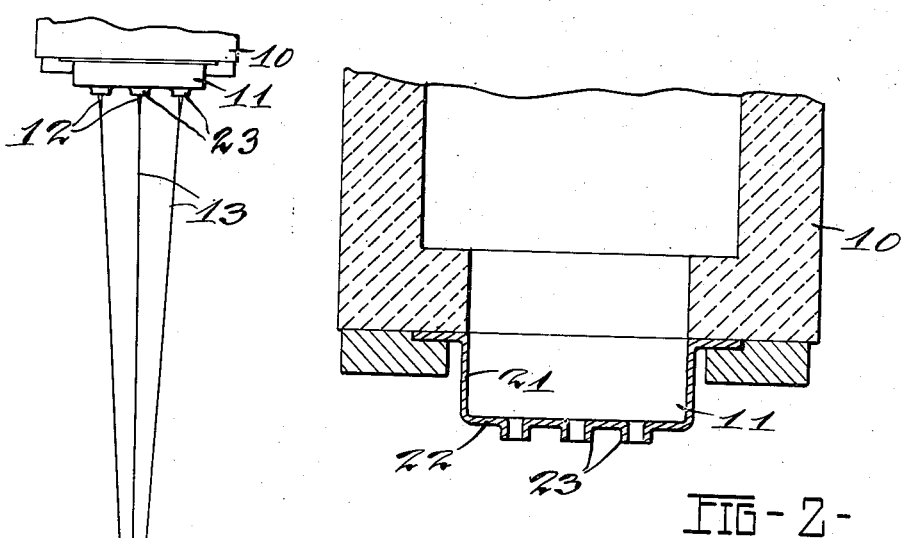
FIG-2-
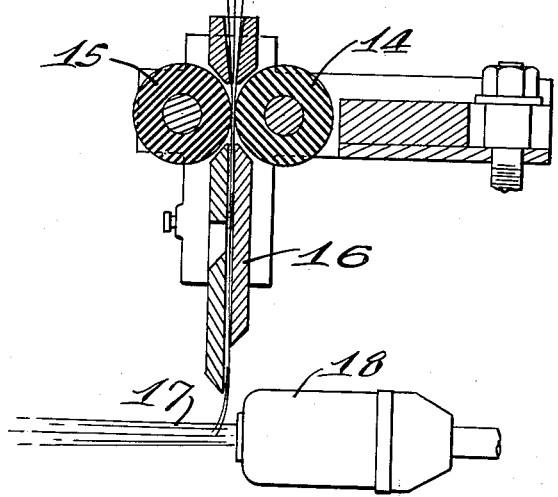
FIG-1-
INVENTOR:
RALPH DE VRIES.
BY
Staelin & Overman
ATTYS.

Patented Aug. 19, 1952

2,607,170

UNITED STATES PATENT OFFICE 2,607,170

APPARATUS FOR CONTACTING MOLTEN GLASS

Ralph De Vries, Newark, Ohio, assignor to Owens-Corning Fiberglas Corporation, a corporation of Delaware Application June 15, 1950, Serial No. 168,317

3 Claims. (Cl. 49—55)

The present invention relates to glass contacting apparatus such as glass working and handling apparatus, for instance, feeders, stirrers, tank liners, and the like. By a feeder is meant any device for conducting the flow of molten glass. For example, such a device for converting the flow of glass into a plurality of small streams may comprise a plate or shallow receptacle having small openings or orifices, which are frequently located in cylindrical nipples, and through which the fluid glass flows or is drawn. While the invention includes other glass-contacting apparatus such as stirrers in the form of shafts or rods with paddles or a propeller at one end to mix the glass in a glass melting tank, tank liners, that is, protective shields or linings for various portions of a glass melting tank, and similar parts, it will be described more particularly in connection with feeders.

One of the long felt wants within the glass industry has been a feeder that successfully withstands over appreciable periods of time the very high temperatures and severe chemical and physical corrosion of molten glass. Platinum has been used for this purpose, but its high cost and limited availability cause its use to be attended with difficulties.

Alloys of platinum with other metals such as rhodium have also been used in feeders for molten glass and alloys of platinum with less expensive metals have been tried in an effort to obtain a satisfactory alloy at a reduced investment, but such alloys still have the very serious limitation that platinum is still used and, in fact, usually constitutes a major portion of the alloy, that is, 80% to 90% or higher.

Another highly desirable property of a metal for feeders is the ability to be cast, forged, reworked, remelted, and the like. After a certain period of service, all known feeders become unsatisfactory for further use. For example, the tiny openings may become enlarged by the constant erosion of flowing glass. In present day operation, such feeders are removed from operation and melted down. The parts for new feeders are then fabricated from this remelted metal with some new metal at times, and subsequently welded together to form the new feeder. This entails skillful labor since platinum and platinum-containing alloys are extremely difficult to weld. Ordinary welding technique is wholly inadequate. Such work is made further difficult in that, because of their great expense, losses of these metals must be kept to an absolute minimum.

The principal object of the invention is to provide improved glass working and handling apparatus that is free of noble metals.

Other objects include providing such glass working and handling apparatus that is chemically stable at high temperatures; that is dimensionally stable and non-volatile at these temperatures; that withstands physical action and abrasion of most common types of glass flowing over its surface; that may be reworked, rerolled, and remelted without changing its properties; and that may be cast or forged and then machined or drilled, and the like.

More specific objects and advantages are apparent from the following description which merely discloses and illustrates the invention and is not intended to limit the claims.

The present invention relates to glass contacting apparatus comprising silicon, chromium, and nickel.

The apparatus is thus characterized by the absence of any of the expensive noble metals. Heretofore, inclusion of one or more of these metals has been considered essential because of their well known chemical inertness when in contact with molten glass. In fact, silicon, chromium, and nickel by themselves are valueless for glass working and handling apparatus. Alone they oxidize readily and display physical properties that make such an application impossible. But when these three elements are combined in accordance with the present invention, glass contacting apparatus of unexpected properties results.

The composition of the apparatus of the present invention comprises substantially 15% to 35% chromium, 0.25% to 2% silicon and 63% to 84.75% nickel.

The presence of 15% chromium is required because the oxidation resistance of the apparatus decreases appreciably when less is employed. On the other hand, if more than 35% chromium is employed, the apparatus is difficult to fabricate or shape. For example, it is not readily cast, forged or welded.

Silicon apparently increases the resistance of the chromium to oxidation at the high temperatures of use of molten glass feeders. If less than 0.25% of silicon is used, this function is not satisfactorily performed. However, no particular increase in advantage is found when more than 2% silicon is used. In fact, there has been found to be some deleterious effect on the shaping and forming properties of the metal when this percentage is exceeded.

The molten alloy may be cast into such intricate parts as feeders for discharging streams of molten glass as described, or cast into stirrers to mix molten glass within a tank. Or alloys within this composition range may be forged into glass contacting elements in sheet form, such as tank liners. In any case, the feeder, stirrer, and the like may be readily machined, drilled or subjected to similar operations. Moreover, this metal may be reworked, remelted, recast, or rerolled without destroying the original desirable properties. However, the stirrers of the present invention are not adaptable for extensive periods of use at the air-glass line. For example, it may be desirable to place a short platinum sheath about the shaft of the stirrer at this point. Such protection, however, is needed only at the liquid level of the molten glass. Feeders, for instance, perform without any protection since at the air-glass line of the openings or orifices the glass is substantially cooler than the glass at the air-glass line at the surface of the molten body within the tank. Also, there are no corrosive gases escaping at the orifices as there are at the air-glass line of the molten batch.

The desirable composition range and the preferred composition are in weight per cent:

|  | Preferred Range | Preferred Composition |
| --- | --- | --- |
|  | Percent | Percent |
| Cr | 20 -30 | 25.0 |
| Si | 0.75- 1.25 | 1.0 |
| Ni | 68.75-79.25 | 74.0 |

The range here specified provides good oxidation resistance coupled with ability of the apparatus to be cast, machined, and the like, while the preferred composition represents the optimum balance of the preferred properties for most uses.

The chief advantages of the apparatus of the present invention are:

1. It is chemically stable in contact with molten glasses up to about 2200° F. The preferred range of use is from 1800° F. to 2000° F.;

2. It is dimensionally stable and non-volatile under molten glass at the highest of these temperatures;

3. It is stable to mechanical action of molten glass in contact therewith even when at the melting temperatures of the glass;

4. It is adaptable to casting or forging and to machining and drilling operations;

5. It may be given a high polish to minimize friction to flowing glass contacting it;

6. It may be reworked, remelted, and rerolled without changing the chemical and physical properties of the metal; and 7. It is relatively inexpensive.

One method of fabricating an apparatus of the present invention comprises first melting the elements in a suitable refractory crucible, for example, in one electrically heated. These operations do not necessarily require an inert atmosphere and may be carried out in air. When the melt is formed, a deoxidizing agent is added. Any deoxidizing agent known in standard metallurgical practice may be used, but one that has been found to be very satisfactory in practicing the present invention comprises the following composition in weight per cent:

| | Percent |
| --- | --- |
| Calcium | 16 to 20 |
| Manganese | 14 to 18 |
| Silicon | 53 to 59 |

The amount of deoxidizing agent used is proportional to about 25 grams of the agent for a 7200 gram melt. After addition of this agent, the heating of the melt is continued until the deoxidation is completed. This may require 30 seconds to 5 minutes depending principally upon the size of the melt. The melt may now be poured into a suitable mold if casting is desired or formed into a blank adaptable to any of the conventional forging procedures.

Upon removing the melt from the crucible, the greater part of the product of the deoxidizing agent remains behind as a slag on the walls. However, some may carry over to the following operations just described. Moreover, it is difficult to obtain the elements in a strictly pure state. Consequently, there are always some impurities present in the apparatus of the present invention. These impurities are chiefly those selected from the group of elements consisting of calcium, manganese, iron, cobalt, magnesium, and aluminum. These impurities can be tolerated in amounts to as much as three per cent although not more than 0.5% of any one impurity should be present.

While the apparatus of the present invention may take various forms, its chief application is as a feeder for flowing streams of molten glass. An example of this use is illustrated by the drawings wherein:

Figure 1 is a diagrammatic, elevational, partly sectional view of means for forming glass filaments incorporating a feeder of the present invention; and Figure 2 is a fragmentary, enlarged cross-sectional view of the feeder of Figure 1.

The invention is shown in association with a tank or container for molten glass 10 and comprises a feeder 11 which issues a plurality of streams 12 of molten glass that are attenuated into filaments 13 by coacting pull rollers 14 and 15. The rollers may be driven by any suitable means. After emerging from between the rollers, the filaments pass through passages in a vertically disposed guide plate 16. The function of the guide plate is to direct the filaments in the desired path and maintain them in definite spaced-apart relation.

At the lower end of the plate 16, the filaments feed into a high speed gaseous blast 17 from a burner 18. The blast moves in a path that is substantially at a right-angle to the direction of travel of the filaments. The blast is intensely hot and moves at terrific velocity so that as the filaments move into its path, they are melted and drawn out by the force of the blast into fine glass fibers. The fibers are borne by the burner blast to a suitable collecting means such as an endless foraminous conveyor. A full description of this process is disclosed in Patent No. 2,489,243 to Stalego.

Referring now to the fragmentary, enlarged view of Figure 2, the container 10 communicates through a conventional opening with the feeder 11. Or if desired, it is possible to feed batch directly into the feeder and melt it by heating the walls of the feeder by passing electric current therethrough.

The feeder itself may take the form of a four-walled container having side walls 21 and a bottom wall or plate 22 secured to the side walls as by welding, using a welding rod having the present alloy composition to effect the weld. The plate 22 has a plurality of openings from which glass streams 12 issue, each opening being the hollow core of a cylindrical nipple 23.

In practice, the plate 22 and nipples 23 are cast integrally in a conventional mold and the nipples subsequently drilled to size. The plate is then welded as described to the side walls which may be of the same alloy composition or of a different composition, for instance, platinum or other noble metal. However, entire feeders have been cast in which both the walls and plate are of the present alloy composition. Such feeders are found to be very satisfactory and frequently preferred in view of the facility of fabrication.

Modifications and variations may be resorted to within the spirit and scope of the appended claims.

I claim:

1. In a glass working and handling apparatus, a container for molten glass having through a wall thereof a passageway through which molten glass flows, said wall being in direct contact with the flowing glass and so positioned that the glass flows over one side thereof with the other side exposed to a gaseous medium while the element is subject to a high temperature, said wall consisting of 15% to 35% chromium, 0.25% to 2% silicon, and 63% to 84.75% nickel.

2. In a glass working and handling apparatus, a container for molten glass having through a wall thereof a passageway through which molten glass flows, said wall being in direct contact with the flowing glass and so positioned that the glass flows over one side thereof with the other side exposed to a gaseous medium while the element is subject to a high temperature, said wall consisting of 20% to 30% chromium, 0.75% to 1.25% silicon, and 68.75% to 79.25% nickel.

3. In a glass working and handling apparatus, a container for molten glass having through a wall thereof a passageway through which molten glass flows, said wall being in direct contact with the flowing glass and so positioned that the glass flows over one side thereof with the other side exposed to a gaseous medium while the element is subject to a high temperature, said wall consisting of 25% chromium, 1% silicon, and 74% nickel.

RALPH DE VRIES.

REFERENCES CITED

The following references are of record in the file of this patent:

UNITED STATES PATENTS

| Number | Name | Date |
|---|---|---|
| 1,190,652 | Henderson | July 11, 1916 |
| 2,238,160 | Doom | Apr. 15, 1941 |

FOREIGN PATENTS

| Number | Country | Date |
|---|---|---|
| 293,727 | Great Britain | July 9, 1928 |
| 355,083 | Great Britain | Aug. 20, 1931 |
| 514,432 | Great Britain | Nov. 8, 1939 |

OTHER REFERENCES

Snook: Treatise in Glass, 1924, 1,417; briefed in Journal of the Institute of Metals, vol. 33, 1925, page 500. (Copy in Division 3.)